United States Patent [19]

Hausberger et al.

[11] 4,233,180

[45] Nov. 11, 1980

[54] PROCESS FOR THE CONVERSION OF CARBON MONOXIDE

[75] Inventors: Arthur L. Hausberger; Edward K. Dienes, both of Louisville, Ky.

[73] Assignee: United Catalysts Inc., Louisville, Ky.

[21] Appl. No.: 960,485

[22] Filed: Nov. 13, 1978

Related U.S. Application Data

[62] Division of Ser. No. 859,271, Dec. 9, 1977, Pat. No. 4,153,580.

[51] Int. Cl.$^3$ .............................................. C01B 2/10
[52] U.S. Cl. ................................... 252/373; 423/655; 423/656
[58] Field of Search .................. 252/373; 423/655, 656

[56] References Cited

U.S. PATENT DOCUMENTS

| | | | |
|---|---|---|---|
| 3,170,758 | 2/1965 | Honerkamp | 423/656 |
| 3,392,001 | 2/1968 | Lorenz et al. | 423/656 |
| 3,529,935 | 9/1970 | Lorenz et al. | 423/656 X |
| 3,899,444 | 8/1975 | Stephens | 252/462 X |
| 3,904,386 | 9/1975 | Graboski et al. | 423/656 X |
| 3,957,962 | 5/1976 | Ramsbotham | 423/655 |

*Primary Examiner*—Howard T. Mars
*Attorney, Agent, or Firm*—William R. Price

[57] ABSTRACT

A process for the conversion of carbon monoxide in synthesis gas mixtures to hydrogen and $CO_2$ utilizes a catalyst which is active in the presence of sulfur compounds, and which comprises the oxides or sulfides of cobalt and molybdenum, supported on a shaped, relatively high surface area aluminous carrier. The carrier is stabilized by admixture with one or more rare earth metal oxides while the alumina is in the hydrated condition. The mixture of hydrated alumina and rare earth metal oxide is formed into a desired shape and calcined to convert the hydrated alumina to the oxide. Thereafter, the calcined, high surface area alumina is impregnated with the desired salts of cobalt and molybdenum and the impregnated catalyst is thereafter calcined and placed into service. The stabilized catalyst exhibits good activity at relatively low temperatures with synthesis gas mixtures containing sulfur compounds and retains its surface area and the aluminous carrier is not converted over to the alpha phase.

8 Claims, No Drawings

PROCESS FOR THE CONVERSION OF CARBON MONOXIDE

CROSS REFERENCE TO RELATED APPLICATION

This application is a division of our earlier filed application entitled C O CONVERSION CATALYST, Ser. No. 859,271, filed Dec. 9, 1977 now U.S. Pat. No. 4,153,580.

FIELD OF THE INVENTION

This invention relates to the production of hydrogen by reaction of steam with carbon monoxide in the presence of a catalyst. More specifically, this invention relates to the production of hydrogen and the conversion of carbon monoxide in synthesis gas mixtures. Still more specifically, this invention relates to the conversion of carbon monoxide to hydrogen and $CO_2$ in synthesis gas mixtures containing sulfur-bearing impurities.

BACKGROUND OF THE INVENTION

The carbon monoxide conversion reaction has, of course, been known for many years as a method of producing hydrogen and $CO_2$. Many catalytic materials have been proposed for use in the CO conversion or water-gas shift process. U.S. Pat. No. 417,068, disclosed that hydrogen could be obtained by passing carbon monoxide and steam over nickel or metallic cobalt spread on a refractory porous material such as pumice stone. Bosch and Wild, in U.S. Pat. No. 1,113,097, proposed that the cobalt constituent be supported on a refractory and porous material. Larson, in 1932, proposed in U.S. Pat. No. 1,889,672, a catalyst comprising copper and various sixth group metal oxides. U.S. Pat. No. 1,797,426 disclosed a reduced copper oxide-zinc oxide (CuO-ZnO) catalyst for the carbon monoxide conversion reaction to be used at reaction temperatures of 570° F. or higher. Nevertheless, industrial practice resolved itself to the use of an iron oxide-chromium oxide catalyst at reaction temperatures of 750 to 850 or more even though equilibrium favors higher conversions of carbon monoxide at lower temperatures. It was not until the proposal by Edward K. Dienes, in U.S. Pat. No. 3,303,001, of a low temperature zinc oxide-copper oxide catalyst active at temperatures of 500° F. or lower, that the art fully appreciated that the process could be carried out at a low temperature to essentially complete conversion. Unfortunately, however, this catalyst does not tolerate even traces of sulfur in the feed. Since coal, coke and heavy hydrocarbon feeds suitable for conversion to hydrogen contain appreciable amounts of sulfur which is converted to hydrogen sulfide and even some small amounts of carbon disulfied and carbonyl sulfide, these feeds are precluded from use with the copper-zinc oxide catalyst and are limited to temperatures up to 950° F. using sulfur-resistant catalysts such as iron oxide promoted with chromium oxide. Due to the increasing shortages of sulfur-free feed stocks and the increasing dependency upon feed stocks containing relatively high percentages of sulfur compounds, the need has been apparent for some time that sulfactive CO conversion catalysts be developed. Various proposals have been made for the use of cobalt and molybdenum oxide and sulfide catalysts supported on relatively high surface area carriers. See, for example the British Pat. No. 940,960, U.S. Pat. No. 3,392,001 and U.S. Pat. No. 3,529,935. Aldridge, et. al., in U.S. Pat. No. 3,850,840, proposed a sulfactive catalyst, active at relatively low temperatures for the conversion of carbon monoxide in sulfur-bearing streams to supplant or replace the copper zinc oxide catalyst in the terminal stages of a multistage conversion process. Aldridge, et. al., point out that the equilibrium of the process is highly dependent upon the temperature and that lower temperatures shift the conversion of CO to the right with increased production of hydrogen. Consequently, conversions can be increased by either removing carbon dioxide and again contacting the gas mixture with the catalyst or by lowering the temperature. By the utilization of a catalyst in the third stage, at a lower temperature which is active in the presence of sulfur, costly operations can be avoided and the process carried essentially to completion. Accordingly, supported cobalt and molybdenum oxide and sulfide catalysts have, to some extent, replaced the classic iron-chromium oxide catalyst at least in the multiple stage reactors in the later stages since these catalysts have a higher degree of activity at lower temperatures than the iron oxide-chromium oxide catalyst. There is a tendency, however, for the catalyst to lose surface area during prolonged usage and to physically deteriorate and lose catalyst strength. This appears to be associated with the conversion of the high surface area aluminas to the alpha stage with a concommitant significant loss of surface area. This phenomena is not fully understood since the transition temperature of gamma alumina to alpha alumina has been reported by Hindin and others to be in the range of 1000°–1200° C. (1832°–2200° F.). The process temperatures never reach these high transitional temperatures but nevertheless, the catalysts do suffer from loss of strength and surface area and the alumina is converted over to the alpha phase. Rare earth metal oxides have been proposed for the stabilization of various high temperature catalysts. Thus, for example, in British Pat. No. 1,398,893, it is proposed to stabilize a coating of transitional alumina and a rare earth metal oxide supported on a ceramic skeletal honeycomb support capable of withstanding a temperature of 1800° F. Further, Stiles, in U.S. Pat. No. 3,645,915, proposes the use of rare earth metal oxides of the lanthanum series for stabilizing a nickel oxide reforming catalyst for the steam hydrocarbon reforming reaction. Stiles, however, coats the nickel and nickel chromite slurry admixed with the rare earth metal oxides onto pellets or particles of alpha alumina. Furthermore, Hindin, in U.S. Pat. No. 3,870,455, proposes the use of rare earth metal oxides by preparing a composite slip of aluminum and group IVB metals and the various other constituents, for coating onto a ceramic honeycomb core for reaction temperatures of 1200° C. (2190° F.) or higher.

SUMMARY OF THE INVENTION

According to this invention, the high surface alumina carrier for the cobalt and molybdenum constituents for use at relatively low temperatures in the presence of steam and $H_2S$ is stabilized by the addition of rare earth metal oxides to the alumina in the hydrated state. The rare earth metal oxides of the lanthanum series are added to the hydrated alumina and the admixture is blended together to form an intimate mixture which, upon drying, is formed into the desired shape. Upon calcination to convert the hydrated alumina over to the oxide of the transitional stage of high surface area alumina, the formed tablets are then impregnated with desired amounts of cobalt and molybdenum salts in conventional manner to prepare the proper catalyst. It has been found that catalysts made in this way have good activity for the CO conversion process in the presence of sulfur compounds and in the presence of steam at relatively low reaction temperatures. These catalysts do not lose surface area even after prolonged usage under extremely rigorous conditions, and furthermore, the carrier does not convert over to the alpha phase. Catalysts prepared according to the process of this invention can be regenerated and reused by oxidizing and resulfiding the catalyst in situ in the reactor. The sulfiding step can be accomplished by passing the process gases containing sulfur compounds over the catalyst.

DESCRIPTION OF THE PREFERRED EMBODIMENT

As previously indicated, with the increased shortages of sweet feed stocks, there has been an ever-increasing need to develop catalysts which are active in the CO conversion reaction in the presence of sulfur compounds. Synthesis gas mixtures are more and more dependent upon sour crudes and/or coal for the production of hydrogen. Such processes, however, are extremely rigorous, requiring catalysts which maintain their surface area, maintain their physical strength and do not shrink and spall under process conditions. The conditions apparently are particularly severe at high partial pressures of steam of the multistage processes. Under these conditions, it has been found that many of the alumina-based catalysts tend to convert over to the alpha stage, lose their characteristic blue color, lose much of their mechanical strength and tend to shrink and spall within the catalyst reactor. This is particularly true after regeneration.

The mechanism by which the gamma alumina support for prior art cobalt molybdenum oxide catalysts was converted to the alpha phase, under process conditions suitable for conversion of carbon monoxide to hydrogen and carbon dioxide, is not fully understood. The transitional temperature for conversion of gamma alumina to the alpha phase is known to be in the range of from 1800° F. to 2200° F. The process temperatures are far below this range. It is further known that molybdenum oxide begins to migrate at temperatures in excess of 1300° F. Therefore, at the high transitional temperatures necessary for conversion of gamma to alpha alumina, the molybdenum oxide would have been completely volatilized from the catalyst pellet. Nevertheless, x-ray diffraction studies of the spent catalyst demonstrates the presence of alpha alumina and an unidentified crystalline phase, but without appreciable loss of molybdenum oxide. The unidentified crystalline phase suggests that under process conditions with a high partial pressure of steam and in the presence of sulfur compounds, a reaction between $H_2S$ and molybdenum oxide or $H_2S$ and aluminum oxide or $H_2S$ and aluminum oxide and molybdenum oxide forms a metal sulfate (as the unidentified phase) which upon reduction reverts to aluminum oxide but in another phase (alpha) or in some way catalyzes the conversion of the alumina to the alpha phase. It has been found, throughout the experimentation leading to this invention, that the formation of the unidentified phase was almost a concommitant to the conversion of gamma alumina to the alpha phase and to the loss of surface area and pellet strength. While we do not wish to be bound by this theory, we believe it offers a plausible explanation for the unexplained loss of surface area and low temperature conversion of the crystalline phase of alumina of prior art catalysts.

Broadly speaking, this invention involves the utilization of a catalyst containing a stabilized aluminous carrier, which, upon calcination, is transformed into the gamma phase and which maintains that phase and a concommitant high surface area at high steam partial pressure and in the presence of sulfur compounds during long hours of operation and through one or more regenerations. The carrier, after the stabilization step is impregnated with solutions of cobalt and molybdenum salts in known manner and recalcined to convert said salts to the oxide. The alumina carrier may be derived by precipitation of an aluminum salt together with or in the presence of an insoluble rare earth metal compound of the lanthanum series. According to a preferred method of preparing the carrier, the compounds of the rare earth metals of the lanthanum series are blended together with a hydrated form of alumina. After the compounds are in intimate admixture and formed into a slurry, the mixture is dried sufficiently to form the admixture into formed particles of desired shapes and the shaped catalyst carriers are then calcined to convert the alumina over to one of the transitional stages and particularly to the gamma stage. All surface areas throughout the specification and the appended claims are measured by the BET or equivalent method.

The catalytically active constituents, i.e., cobalt and molybdenum are present in the finished catalyst by reason of impregnation from water-soluble salt solutions. Thus, the cobalt constituent can be impregnated onto the carrier form an amine carbonate solution or from a nitrate solution so that the finished concentration of the cobalt in the finished catalyst amounts to 2 to 5 percent by weight, (expressed as the metal), of the total catalyst, including the carrier. Molybdenum, on the other hand, is usually present in the form of ammonium molybdate in an aqueous solution and the catalyst carriers are dipped thereon until the concentration of molybdenum oxide on the finished catalyst, (expressed as the metal) is in the range of 10 to 16 percent and preferably in the range of 13 to 15 percent. One of the advantages of the cobalt ammine carbonate impregnating material is the fact that the ammonium molybdate is also soluble in water under these conditions so that the materials can be impregnated onto the carrier by simultaneous dips. After impregnation, the catalyst is dried and calcined to convert the cobalt and molybdenum compounds over to the oxide. The production of this catalyst then involves two calcinations. The first calcination is of the shaped or formed particles of alumina and rare earth metal salts to convert the non-oxide constituents over to the oxide and to allow the stabilizing component oxides to enter the alumina lattice and thus prevent or substantially reduce the subsequent transition of the high surface area alumina oxide to the alpha alumina. This calcination should be within the range of 900° to 1600° F. Temperatures at the higher end of the scale are to be avoided since the transition of the gamma alumina to the alpha phase is especially prevalent at temperatures of 1800° F. and above. The second calcination should be in a substantially lower range, of from 700° to 1100° F. to convert the salts of cobalt and molybdenum over to their oxides after impregnation onto the stabilized and shaped carrier.

Water-gas shift reactions are well known. The total amount of steam according to the present invention, is in the range of from 0.5 to about 100, i.e., preferably 1.5 to 25 volumes of steam per volume of carbon monoxide. The pressure is preferable in the range of 200 to 1500 pounds per square inch, PSIG, although it may vary from 1 to 200 atmospheres or more. The temperature and pressure of the reaction mixture in contact with the process catalysts are maintained such that the temperature is above the dew point temperature of the mixture and so that the pressure is below the dew point pressure. The process is particularly effective when the feed contains minor amounts of sulfur in the form of $H_2S$, organic sulfides and the like. In fact, the presence of small amounts of sulfur in the feed actually results in increased conversion in many cases. Further, the catalyst of this invention may be regenerated by oxidation and by subsequent resulfiding.

It is within the scope of this invention to use any of the rare earth oxides of lanthanum series as a stabilizing material for the alumina carrier. It is believed, however, that lanthanum itself is the most effective, however, neodymium, cerium or praseodymium may be used separately or in conjunction with the other rare earth oxides. In order to present the invention with a certain amount of consistency, however, the lanthanum-rich rare earth oxides of commerce mixture have been utilized throughout. A typical composition of this admixture is as follows:

| OXIDE | FORMULA | PERCENTAGE |
|---|---|---|
| Lanthanum | $La_2O_3$ | 60 percent |
| Neodymium | $Nd_2O_3$ | 21.5 percent |
| Cerium | $CeO_2$ | 10 percent |
| Praseodymum | $Pr_6O_{11}$ | 7.5 percent |
| Other rare earth oxides | (REO) | 1.0 percent |

The rare earth metal oxides utilized with the carrier can range in concentration of from 0.5 to 10 percent by weight (expressed as the metal) and preferably is in the concentration of about 3 percent. The ratio of rare earth metal oxides to alumina oxide, i.e., $REO:Al_2O_3$ should be less than 1:10 and the ratio of 1:100 has been found perfectly suitable in our work.

IMPREGNATING SOLUTION

In all of the examples, to be consistent throughout the specification, the impregnating solution was made as follows. It should be noted that various of the constituents would be varied in concentration from time to time in order to vary the final composition of the catalyst. Nevertheless, basically, the materials were prepared as follows. To a desired amount of cobalt ammine carbonate solution, a desired amount of ammonium molybdate was added until the ratio of molybdenum:cobalt in the impregnating solution was equivalent to that desired in the finished catalyst. The desired concentration of catalytic constituents is governed by the metal concentration of the impregnating solution.

EXAMPLE 1

25 pounds of hydrated alumina was placed into a blender along with 53 grams of spray-dried silica oxide. To this was added slowly 362 grams of the high-lanthanum rare earth nitrate solution dissolved in 30 gallons of water. The entire mixture was blended until homogenous. The time was then recorded and the homogenous mixture was dried at 300° F. to a level of 25 percent loss on ignition. At that time, the time was then recorded as well as the loss on ignition figure. The dried material was granulated and mixed with 3 percent of aluminum stearate. The mixture was tableted and thereafter calcined at 1250° F. These tablets were immersed in the cobalt and molybdenum ammine solution and dried sufficiently and recalcined again at 900° F. The finished catalyst had the composition shown in TABLE I.

EXAMPLE 2

This catalyst was prepared according to the procedure for Catalyst C in U.S. Pat. No. 3,529,935. 885 grams of $Al_2(SO_4)_3.18H_2O$ and 650 grams of $ZnSO_4.7H_2O$ were dissolved in four liters of water and heated to 90° C. Ammonia was added until the pH was 6.8. The resulting precipitate was filtered and washed with 1 percent aqueous $(NH_4)CO_3$ until free from sulfate. This carrier was then compounded with 49 grams of $Co(CO_3)_2.6H_2O$ and 44 grams of ammonium molybdate. Thereafter, it was dried at 212° F., tableted and calcined at 1112° F. This catalyst had the composition and the properties shown under Example 2 of TABLE I.

EXAMPLE 3

This catalyst corresponds to catalyst D of U.S. Pat. No. 3,529,935. 2400 grams of caustic magnetite and 8250 grams of boehmite were dry mixed. Then 250 milliliters of 37.5 percent cobalt nitrate solution and 2000 milliliters of a 68 percent ammonium molybdate solution were added and mixed into this material. The mixed material was dried at 212° F., granulated and tableted. The tablets were calcined at 1112° F. The composition of this and characteristics of this catalyst are as shown as Example 3 of TABLE I.

TABLE I

| EXAMPLE COMPOSITION | 1 | 2(C) 3,529,935 | 3(D) 3,529,935 | 4 IVD | 5 IV |
|---|---|---|---|---|---|
| CoO | 3.6 | 4.0 | 4.0 | 3.5 | 3.35 |
| $MoO_3$ | 14.8 | 10.0 | 10.0 | 13.5 | 14.8 |
| $Al_2O_3$ | 74.5 | 47.3 | 62.6 | 75.7 | 81.85 |
| Other | 6.3REO .8 SiO | 38.7 ZnO | 23.4 MgO | 5.6REO 1.7 SiO | |
| Size | ⅛ × ⅛" | ⅛ × ⅛" | ⅛ × ⅛" | ⅛ × ⅛" | ⅛ × 3/16" Ext. |
| Crush Strength Pounds DWL* | | | | | |
| New | 15 | 20 | 22 | 17 | 20 |
| Used 60 hours | 12 | | 5 | 30 | 10 |
| 100 hours | | 12 | | | 5.6 |
| Regenerated | 11 after 100 hours | 16 after 120 hours | 7 | 13.6 | 4.0 |
| Crush Retention | | | | | |

TABLE I-continued

| EXAMPLE COMPOSITION | 1 | 2(C) 3,529,935 | 3(D) 3,529,935 | 4 IVD | 5 IV |
|---|---|---|---|---|---|
| Percent** | 73% | 80% | 31.8% | 80.0% | 20.0% |
| Surface Area m²/gram | | | | | |
| initial | 175 | 127 | 137 | 128 | 228 |
| 100 hours | 101 | 54.8 | 32.7 | 97 | 50.1 |
| % Retention*** | 57.5 | 43.1 | 23.9 | 75.7 | 22.0 |
| Activity steaming | test % CO leakage | | | | |
| Initial | 3.1 | 2.4 | 2.3 | 2.03 | 3.7 |
| After 60 hours 800° F. | 2.1 | 5.6 | 1.3 | 4.00**** | 4.9 |
| After 100 hours 900° F. | 2.2 | 3.8 | — | — | 3.5 |
| X-ray diffraction New | Gamma Al₂O₃ | Gamma Al₂O₃ Unidentified Phase | Gamma Al₂O₃ Unidentified Phase | Gamma Al₂O₃ | Gamma Al₂O₃ |
| Discharged cat. Used | Gamma Al₂O₃ | Gamma Unidentified Phase Alpha Al₂O₃ | MgO Unidentified Phase MgAl₂O₃ Gamma Al₂O₃ Alpha Al₂O₃ | Gamma Al₂O₃ | Alpha Al₂O₃ Unidentified Phase |

*Dead Weight Load

**Crush Retention = $\frac{\text{Regenerated catalyst after 100 hours use}}{\text{New crush strength}} \times 100 = \text{Crush Retention \%}$

***Surface Area Retention = $\frac{\text{Surface area m}^2/\text{gram after regeneration after 100 hours use}}{\text{Initial surface area m}^2/\text{gram}}$

****Stopped test reactor plugged

EXAMPLE 4

This catalyst was prepared in the same manner as the catalyst of Example 1, except that the proporation of the rare earth nitrate solution was lowered slightly while the percentage of the spray-dried silica oxide was increased slightly in the carrier composition. The catalyst carriers were tableted and calcined at 1250° F. These were then impregnated in the impregnating solution until the concentration of cobalt oxide and molybdenum oxide equalled that shown under Example 4 of TABLE I.

EXAMPLE 5

Example 5 was a sample taken from commercial plant production and did not contain the rare earth oxide stabilizer nor the silica oxide. The composition was identical to that shown under Example 5 of TABLE I as an unstabilized and unpromoted cobalt moly catalyst on activated alumina. Each of these catalysts was subjected to a specialized steaming test which has been developed to evaluate and screen various catalyst preparations. This test involved utilization of the following inlet gas stream concentrations.

| COMPONENT | PERCENTAGE |
|---|---|
| CO | 49 percent |
| H₂ | 49 percent |
| H₂S | 2.0 percent |

This gas mixture was passed over the catalyst with a steam to gas ratio of 3:1 and at a temperature of 800 degrees F. for 60 hours. The space velocity which is defined as the volume of gas passed over a volume of catalyst per hour on a dry basis was 3,000 and the pressure was 1,000 PSIG. At the end of 60 hours, the temperature was raised from 800° F. to 900° F. and the test was continued under the same conditions except for the higher temperature for another 40 hours. At that time, the catalyst was regenerated in air to burn the carbon and residue off the catalytic surfaces and thereafter was tested for activity.

Referring now to TABLE I, it will be seen that the crush strength of new tablets, Examples 1 through 5, was essentially the same, ranging from 15 to 22 pounds dead weight load. However, after the catalyst had been used for 60 hours, i.e., with Example 1, the crush strength was reduced to 12 pounds dead weight load and after 100 hours, the crush strength for the stabilized catalyst of Example 1 still remained at 12 pounds dead weight load as compared to 5.6 pounds for the unpromoted cobalt moly catalyst of Example 5. After regeneration, the crush strength for the catalyst of Example 1 was 11. The crush strength of the catalyst C of Example 2 was 16 and the crush strength of the stabilized catalyst of Example 4 was 13.6. This compared with a crush strength retention of catalyst 1 of 73 percent and 80 percent respectively of Examples 1 and 4, versus 31.8 percent of catalyst D of Example 3. The crush strength retention is determined by the formula shown at the bottom of TABLE I.

Referring now to the surface area, it will be noted again that the initial surface areas will range from 127 up through 228. However, after 100 hours of use, and regeneration, the surface area of the catalyst of Example 1 had been reduced from 175 square meters per gram to 101 square meters per gram. It should be noted, however, that the surface areas of Examples 2 and 3 had been reduced to 54.8 and 32.7 square meters per gram respectively. Please also note that the stabilized catalyst of Example 4 had reduced in surface area to 97 square meters per gram as compared to 50 square meters per gram for the unstabilized cobalt moly catalyst of Example 5. Thus, the percent surface area retention for the stabilized catalyst was clearly superior to the catalyst of U.S. Pat. No. 4,529,935 and to the unstabilized cobalt moly catalyst. Again, the activity as measured by the percent of CO leakage after a number of hours of the stabilized catalysts of Example 1, was clearly equivalent or superior to any of the other catalysts. It is of interest, however, to show that x-ray diffraction tests made on the discharged catalyst showed that the stabilized catalyst of Examples 1 and 4 still showed gamma alumina whereas the unstabilized catalyst of Examples 2 and t showed alpha alumina and the unstabilized catalyst of 3 and 5 also showed an unidentified phase.

EXAMPLE 7

The catalyst of Example 7 was a commercial run of plant-produced cobalt moly catalyst containing 3.22 percent CoO, 14.11 percent $MoO_3$ and the balance gamma alumina.

Since the majority of problems with the catalyst have appeared to occur on commercial installations with high partial steam pressures encountered in the multi-stage CO conversion systems, a prolonged life test was run with the catalyst of Example 6 compared with the standard cobalt moly catalyst. The conditions of this test were made up to simulate the gas stream and the other conditions in a regular commercial installation. These conditions are as follows. GAS COMPOSITION: 3.5 percent CO, 32.5 percent $CO_2$, 63 percent hydrogen, 1 percent $H_2S$. CONDITIONS: Pressure, PSIG, 410; Space velocity, 4500; Steam to Gas, 1:1; Temperature, 650 degrees.

TABLE II

SUMMARY OF ACTIVITY OF CATALYST PROPERTIES AFTER 307 HOUR TEST

| CATALYST Time | EXAMPLE 6 ACTIVITY | | EXAMPLE 7 ACTIVITY | |
|---|---|---|---|---|
| | % CO in | % CO out | % CO in | % CO out |
| 0 hours | 3.60% | 1.30% | 3.60% | 1.33% |
| 100 hours | 3.40% | .856% | 3.40% | 1.19% |
| 238 hours | 3.64% | 1.36% | 3.64% | 1.36% |

| | RARE EARTH STABILIZED (1250° F.) CARRIER (1 REO:25 Al) | |
|---|---|---|
| % CoO | 4.06% | 3.22% |
| % $MoO_3$ | 16.6% | 14.11% |
| % REO | 56% | 0 |
| % $SiO_2$ | 1.7% | 0 |
| % $Al_2O_3$ | 72.04% | 82.67% |
| Form | Tablet | Extrusion |
| Size | 3/16 × ⅛" | ⅛" |
| Crush, Lbs. DWL | 32.1 | 27.4 (20) |
| Density, Lbs./CF | 47.0 | 43.0 |
| S.A., $m^2$gm | 222 | 212 |
| P.V., cc/gm | | |
| XRD | $\alpha Al_2O_3$ | $\alpha Al_2O_3$ |
| Third Bed Test Dropped Catalyst | | |
| Crush | 28.0 | 3.8 |
| Crush Retention | 87% | 14% |
| S.A. | 164 | 61.9 |
| S.A. Retention | 73.8% | 29% |
| X-ray Diffraction Discharged | Gamma Alumina | Gamma Alumina Alpha Alumina Appeared light blue to white in color |

EXAMPLE 6

Carrier material prepared in accordance with Example 1 was immersed in the impregnating solution utilized in this example until the finished composition of the catalyst was such as shown in TABLE II for EXAMPLE 6. The ratio of rare earth oxides to $Al_2O_3$ was 1:25.

TABLE II

THIRD BED DATA

| Days | Time | SV | Hours on Stream | Tube I, Ex. 6 REO at 1250° F. Calc. | Tube II, Ex. 7 STD SR9925 Lot 10 | Temp. °F. |
|---|---|---|---|---|---|---|
| 1 | 4:00 | 4500 | 5 ½ | 1.30% | 1.33% | 650 |
| 2 | 8:00 | 1500 | 21 ½ | 0.80% | 1.23% | " |
| 2 | 4:00 | 4500 | 29 ½ | 1.71% | 1.40% | " |
| 3 | 8:00 | 1500 | 45 ½ | 1.14% | 1.96% | " |
| 3 | 4:00 | DID NOT SHOOT HAD TO DRAIN K.O. POTS | | | | |
| 4 | 11:30 | 1500 | 73 | 0.64% | 2.73% | " |
| 5 | 10:00 | 1500 | 95 ½ | 0.91% | 2.85% | " |
| 6 8 | LOCKED IN AND DROPPED TUBE II. RELOADED TUBE II. REDUCED OVERNIGHT WITH $H_2$ at 670° F. SULFIDED FOR 3 HOURS WITH 1% $H_2S/H_2$ at 685° F. | | | | | |
| 9 | 4:00 | 4500 | 101 | 0.856% | 1.19% | " |
| 10 | 8:00 | 1500 | 117 | 1.04% | 0.93% | " |
| 10 | 4:00 | 4500 | 125 | 0.99% | 1.33% | " |
| 11 | 8:00 | 1500 | 141 | 2.50% | 2.68% | " |
| 11 | 4:00 | 4500 | 149 | 1.31% | 1.15% | " |

TABLE II-continued
THIRD BED DATA

| Days | Time | SV | Hours on Stream | Tube I, Ex. 6 REO at 1250° F. Calc. | Tube II, Ex. 7 STD SR9925 Lot 10 | Temp. °F. |
|---|---|---|---|---|---|---|
| 12 | 8:00 | 1500 | 165 | 2.34% | 3.53% | " |
| 12 | 2:00 | 4500 | 171 | 1.40% | 1.37% | " |
| 13 | 11:00 | 1500 | 190 | 1.54% | 2.80% | " |
| 13 | LOCKED IN- RAN OUT OF CO | | | | | |
| 16 | PUT ON SULFIDING GAS (1% $H_2S/H_2$), WITH SLOW BUBBLE RATE at 650° F. PUT ON STREAM | | | | | |
| 16 | 3:00 | 1500 | 190 | — | — | " |
| 17 | 9:00 | 1500 | 208 | 0.65% | 0.84% | " |
| 17 | 3:30 | 4500 | 214½ | 1.39% | 1.52% | " |
| 18 | 8:00 | 1500 | 231 | 0.708% | 0.729% | " |
| 19 | 8:00 | 1500 | 255 | 0.593% | 0.659% | 585 |
| 19 | 4:00 | 4500 | 263 | 7.19% low steam | 1.27% | 600 |
| 20 | 6:00 | 1500 | 277 | 0.48% | 0.79% | 600 |
| 20 | 2:00 | 4500 | 285 | 1.51% | 1.51% | 600 |
| 21 | 9:00 | 1500 | 302 | 7.75% low steam | Tube plugged | 550 |
| 21 | 3:30 | 4500 | 307½ | 1.60% | 1.68% | 550 |

The catalyst volume of the bench scale reactor was 20 cc. The catalyst of Example 6, i.e., the stabilized catalyst, having a rare earth oxide to aluminum oxide ratio of 1:25 was placed in tube 1 and the standard cobalt moly plant production catalyst was placed in tube 2. TABLE III reproduces the exact laboratory data for this test. The dates have been changed to number of days. Thus, for example, where there appears to be two second days, merely means that there were two readings taken on the second day. In some instances, a day or two days will be omitted which corresponds possibly to weekends. In any event, a review of the data as it appeared, as the raw readings were taken, indicates that the activity of the catalyst in tube 1 and tube 2, i.e., Example 6 and Example 7, were essentially equivalent within experimental error throughout the test. In summary, for example, the data shown in TABLE II which shows that after 100 hours, the outlet CO for catalyst 6 was 0.86, versus 1.19 for catalyst 7 and at 238 hours, the reading for catalyst 6 was 1.36 percent CO outlet versus 1.36 CO outlet for catalyst 7. The difference, however, is shown in the actual surface area retention and crush strength retention. Catalyst 6 showed a crush strength retention of 87 percent versus 14 percent for catalyst 7. Likewise, the surface area retention for catalyst 6 was 73.8 percent versus 29 percent for catalyst 7. The x-ray diffraction of the discharged catalyst showed the stabilized catalyst, catalyst 6, all of the alumina was in the gamma phase. Whereas, the x-ray diffraction analysis showed that for the discharged catalyst from Example 7, part of the alumina was in the gamma phase, part was in the alpha phase. The physical condition and appearance of the catalyst discharged from Example 7 was that the catalyst appeared very friable and light blue to white in color.

TABLE IV

| Catalyst | 8 | | | 9 | | | 10 | 4 | 11 | 12 | 13 | 14 |
|---|---|---|---|---|---|---|---|---|---|---|---|---|
| Composition | SR9236 | | | SR9925 | | | P-1 | PIVD | PIVDN | PIVDN | | |
| CoO | 3.65 | | | 3.35 | | | 3.67 | 3.5 | 3.3 | 4.06 | 4.0 | 4.0 |
| $MoO_3$ | 14.55 | | | 14.11 | | | 14.8 | 13.5 | 12.6 | 16.6 | 14.9 | 15.5 |
| REO | | | | | | | 6.3 | 5.6 | 5.6 | 5.6 | 1.27 | 2.46 |
| SiO | | | | | | | 0.8 | 1.7 | 1.7 | 1.7 | 0.47 | 0.91 |
| $Al_2O_3$ | 81.80 | | | 82.54 | | | 74.5 | 75.7 | 72.04 | 72.04 | 77.36 | 77.13 |
| $REO:Al_2O_3$ | | | | | | | | 1:25 | 1:25 | 1:25 | 1:100 | 1:50 |
| Surface Area $m^2$/gm. | | | | | | | | | | | | |
| New | 180 | | | 228 | | | 175 | 128 | 92.6 | 222 | 183 | 160 |
| Used Run | 1 | 2 | 3 | 1 | 2 | 3 | | | | | | |
| | 63 | 95 | 60 | 7.38 | 50.1 | 63.7 | 101 | 97  55 | 111 | 125 | 138 | 135 |
| Surface Area % Retention | 36 | 53 | 33 | 32 | 22 | 27.9 | 58 | 76  43 | 100+ | 56 | 75 | 84 |
| Crush Strength Dead Weight Load | | | | | | | | | | | | |
| New | 22 | | | 20 | | | 15 | 17 | 33 | 32.8 | 19.9 | 22.7 |
| Used Run | 1 | 2 | 3 | 1 | 2 | 3 | | | | | | |
| | 5 | 4 | 2 | 3 | 4 | 3 | 11 | 14  9 | 17 | 18 | 18.3 | 13.2 |
| Retention percent | 23 | 18 | 9 | 15 | 20 | 15 | 73 | 76  53 | 52 | 56 | 72 | 58 |
| X-Ray Diffraction | | | | | | | | | | | | |
| New | gamma | | | gamma | | | gamma | gamma | gamma | gamma | gamma | gamma |
| Used | | | | | | | | | | | | |
| Gamma | | x | x | x | x | x | x | x | x | x | x | x |
| Alpha | x | x | x | x | x | x | | | | | | |
| Unidentified Phase | | | | | | | | | x | | | |

TABLE IV-continued

| Summary: | Unstabilized | Stabilized |
|---|---|---|
| Average Crush Retention % | 16.7 | (1) 65.3 |
| Average Surface Area Retention % | 34.0 | 62.9 |
| Formation of some alpha alumina | All cases except in tablet form | none |

(1) Note average excludes Run II which showed 100% retention

EXAMPLES 8 AND 9

The catalysts of these examples were taken from lots of commercially-prepared cobalt moly alumina catalysts. The composition of each of these catalysts is identical to that shown under catalyst 8 and 9 of TABLE IV.

EXAMPLES 10, 11, 12, 13 AND 14

The catalysts of these examples were prepared according to the methods set forth in Example 1 except for variation in the various constituents. Catalysts 10, 4, 11 and 12 all have a ratio of rare earth oxide to aluminum oxide of 1:25. However, catalysts 13 and 14 have a 1:100 ratio and a 1:50 ratio of REO:Al$_2$O$_3$ respectively. It will be noted that for each of the catalysts of Examples 8 and 9, there were three separate runs. The surface area, new and used, in each of these runs, were within experimental limits. Without going into each item of the material listed in the table, each of these catalysts were subjected to the standard steaming test which was previously described.

In summary, the average crush strength retention for the unstabilized catalysts of Examples 8 and 9 was 16.7 percent as compared to 65 percent for the stabilized catalyst. The average surface area retention for the unstabilized catalyst was 35.2 percent as compared to 59.0 percent for the stabilized catalyst. Further, for the unstabilized catalysts, alpha alumina was formed in all cases except for the catalysts. For the stabilized catalysts, however, the x-ray diffraction did not show any formation of alpha alumina. In order to further demonstrate the effect of smaller amounts of the rare earth oxides in the alumina carrier, the catalyst of Example 13 in which the ratio of REO:Al$_2$O$_3$ was 1:100 was compared with the unstabilized catalyst of Example 8. Both of these catalysts were tested under the third bed conditions previously mentioned. Referring now to TABLE V, it is shown that the activity of the catalyst 13 was equivalent to the standard commercial plant catalyst of Example 8. However, the crush strength retention of this catalyst even at a ratio of REO:Al$_2$O$_3$ of 1:100 was 72 percent versus 23 percent for the plant production catalyst. The surface area retention of the stabilized catalyst was 75 percent versus 36 percent. These tests illustrate consistently that the catalyst of this invention has equivalent activity to the plant production catalyst. However, the catalyst of this invention also shows a crush strength retention much superior to that of the commercial catalyst, a surface area retention much superior to that of the commercial catalyst and a certain inhibiting effect to the formation of the alpha form of alumina with its concomitant loss of surface area and strength.

TABLE V

| Catalyst Composition | 13 | 8 |
|---|---|---|
| CoO | 4.0 | 3.65 |
| MoO$_3$ | 14.9 | 14.55 |
| Al$_2$O$_3$ | — | Bal. |
| REO | — | None |
| Ratio REO:Al$_2$O$_3$ | 1:100 | |

TABLE V-continued

| CO % | | In | Out | In | Out |
|---|---|---|---|---|---|
| | 650° | 3.40 | 1.17 | 3.40 | 1.22 |
| | 600° | 3.10 | 1.34 | 3.10 | 1.53 |
| | 550° | 3.10 | 1.76 | 3.10 | 1.69 |
| Crush Strength | | | | | |
| | New | | 19.9 | | 22 |
| | Used | | 14.4 | | 5 |
| Crush Strength Retention | | | 72% | | 23% |
| Surface Area | | | | | |
| | New | | 183 | | 180 |
| | Used | 138 | | 63 | |
| | Retention | | 75% | | 36% |

It should be apparent to those skilled in the art that the examples given herein and the data presented herein are meant to be exemplary in nature and nonlimiting except so as to be commensurate in scope with the appended claims.

We claim:

1. A process for the catalytic conversion of carbon monoxide with steam to form hydrogen and carbon dioxide in the presence of a catalyst which comprises the step of passing a reaction mixture comprising carbon monoxide and steam at a temperature of from 300° to 1000° F., but above the dew point temperature of said reaction mixture and at a pressure below the dew point pressure of said reaction mixture but within the range of from 1 to 200 atmospheres over a catalyst comprising a compound of molybdenum supported on a stabilized aluminous support comprising aluminum oxide in the gamma phase in intimate association with a rare earth metal oxide of the lanthanum series.

2. The process of claim 1, the further improvement wherein said catalyst includes a compound of cobalt in addition to a compound of molybdenum oxide.

3. A process for the conversion of carbon monoxide to carbon dioxide, as defined in claim 1, in which said compounds of cobalt and molybdenum are derived from heat decomposable salts of said metals and which are impregnated onto said stabilized alumina support and calcined to convert said salts to the oxide.

4. A process for the conversion of carbon monoxide to carbon dioxide, as defined in claim 1, in which the compounds of cobalt and molybdenum includes one or more sulfides.

5. A process for the conversion of carbon monoxide as defined in claim 1, in which the carbon monoxide and steam mixture contains sulfur compounds.

6. A process for the conversion of carbon monoxide as described in claim 1, in which the compound of sulfur is hydrogen sulfide.

7. A process for the conversion of carbon monoxide, as defined in claim 1, the further step of converting said oxide of molybdenum to the sulfide, including contacting said catalyst with a carbon monoxide steam reaction mixture containing a sulfur-bearing compound.

8. A process of CO conversion as defined in claim 1, in which the catalyst upon loss of some of its activity due to the deposition of carbonaceous materials thereon, is regenerated by the steps of oxidizing said catalyst in situ, thereafter sulfiding said catalyst by contacting same with a gas containing a sulfur compound.

* * * * *